(12) United States Patent
Kano et al.

(10) Patent No.: US 10,103,593 B2
(45) Date of Patent: Oct. 16, 2018

(54) LINEAR MOTOR

(71) Applicants: National Institute of Technology, Hachioji-shi, Tokyo (JP); KYB Corporation, Tokyo (JP)

(72) Inventors: Yoshiaki Kano, Aichi (JP); Kousuke Sato, Kanagawa (JP); Noriyuki Takahashi, Kanagawa (JP)

(73) Assignees: NATIONAL INSTITUTE OF TECHNOLOGY, Hachioji-Shi, Tokyo (JP); KYB Corporation, Tokyo (JP)

( * ) Notice: Subject to any disclaimer, the term of this patent is extended or adjusted under 35 U.S.C. 154(b) by 179 days.

(21) Appl. No.: 15/106,496

(22) PCT Filed: Oct. 23, 2014

(86) PCT No.: PCT/JP2014/078261
§ 371 (c)(1),
(2) Date: Jun. 20, 2016

(87) PCT Pub. No.: WO2015/136758
PCT Pub. Date: Sep. 17, 2015

(65) Prior Publication Data
US 2016/0336825 A1    Nov. 17, 2016

(30) Foreign Application Priority Data
Mar. 12, 2014    (JP) ................... 2014-049288

(51) Int. Cl.
*H02K 41/02* (2006.01)
*H02K 3/28* (2006.01)
(Continued)

(52) U.S. Cl.
CPC ............... *H02K 3/28* (2013.01); *H02K 3/12* (2013.01); *H02K 41/02* (2013.01); *H02K 41/031* (2013.01)

(58) Field of Classification Search
CPC ............. H02K 3/28; H02K 3/12; H02K 41/02
(Continued)

(56) References Cited

U.S. PATENT DOCUMENTS 7,586,217 B1 *   9/2009   Smith .................... H02K 41/03
                                                                310/12.24
9,685,847 B2 *   6/2017   Filippa ................... H02K 33/02
(Continued)

FOREIGN PATENT DOCUMENTS

| EP | 2541744 A2 | 1/2013 |
| JP | 2008-005665 A | 1/2008 |
| JP | 2009-291069 A | 12/2009 |

*Primary Examiner* — Hanh Nguyen
(74) *Attorney, Agent, or Firm* — Rabin & Berdo, P.C.

(57) ABSTRACT

A linear motor has a tubular body and a rod that penetrates the tubular body in an axial direction, and is configured to displace the tubular body and the rod relative to each other in the axial direction. The linear motor includes: 12n+1 (where n is a positive integer) teeth arranged in the axial direction so as to project from an inner peripheral surface of the tubular body; 12n slots respectively formed between adjacent teeth of the plurality of teeth; 12n coils respectively disposed in the slots; and a plurality of permanent magnets held in the rod so as to be arranged in the axial direction. The respective coils are formed by being wound around an axis of the rod in an identical direction, and the number of permanent magnets positioned in the tubular body is set to 8n.

4 Claims, 5 Drawing Sheets

(51) Int. Cl.
*H02K 41/03* (2006.01)
*H02K 3/12* (2006.01)

(58) Field of Classification Search
USPC .................. 310/12.01–12.33, 15, 25, 36
See application file for complete search history.

(56) References Cited

U.S. PATENT DOCUMENTS

| | | | |
|---|---|---|---|
| 2007/0024127 A1* | 2/2007 | Yasuda | H02K 21/44 310/12.24 |
| 2008/0001483 A1 | 1/2008 | Kitamura et al. | |
| 2013/0038144 A1* | 2/2013 | McAleese | H02K 41/02 310/12.21 |
| 2014/0042833 A1 | 2/2014 | Hiura et al. | |

* cited by examiner

LINEAR MOTOR

TECHNICAL FIELD

The present invention relates to a linear motor.

BACKGROUND ART

JP2009-291069A discloses a linear motor that displaces a tubular yoke and a rod relative to each other in an axial direction by attracting a permanent magnet disposed on an outer peripheral surface of the rod using a moving magnetic field generated around a coil disposed on an inner peripheral surface of the yoke. FIG. 5 of JP2009-291069A shows a so-called ten-pole, twelve-slot linear motor in which the number of permanent magnets positioned in the yoke is ten and the number of slots formed in the yoke for disposing the coils is twelve.

SUMMARY OF INVENTION

Such a linear motor is used in an automobile, an aircraft, or the like as a drive source for a driving actuation system or a damping actuation system. It is desired that the linear motor serving as a part of the actuation system generates a thrust in an axial direction as large as possible so that control thereof can be carried out smoothly even during a high load operation.

In the ten-pole, twelve-slot linear motor described above, a coil winding direction differs from each other in accordance with a position of the slot in which the coil is disposed, and the linear motor thus has a complicated configuration.

It is an object of the present invention to provide a linear motor that is capable of generating a large thrust in an axial direction with a simple configuration.

According to an aspect of the present invention, there is provided a linear motor that has a tubular body and a rod that penetrates the tubular body in an axial direction, and is configured to displace the tubular body and the rod relative to each other in the axial direction. The linear motor includes: 12n+1 (where n is a positive integer) teeth arranged in the axial direction so as to project from an inner peripheral surface of the tubular body; 12n slots respectively formed between adjacent teeth of the plurality of teeth; 12n coils respectively disposed in the slots; and a plurality of permanent magnets held in the rod so as to be arranged in the axial direction. The respective coils are formed by being wound around an axis of the rod in an identical direction, and the number of permanent magnets positioned in the tubular body is set to 8n.

DESCRIPTION OF EMBODIMENTS

Hereinafter, an embodiment of the present invention will be described with reference to the accompanying figures.

Figure 1:
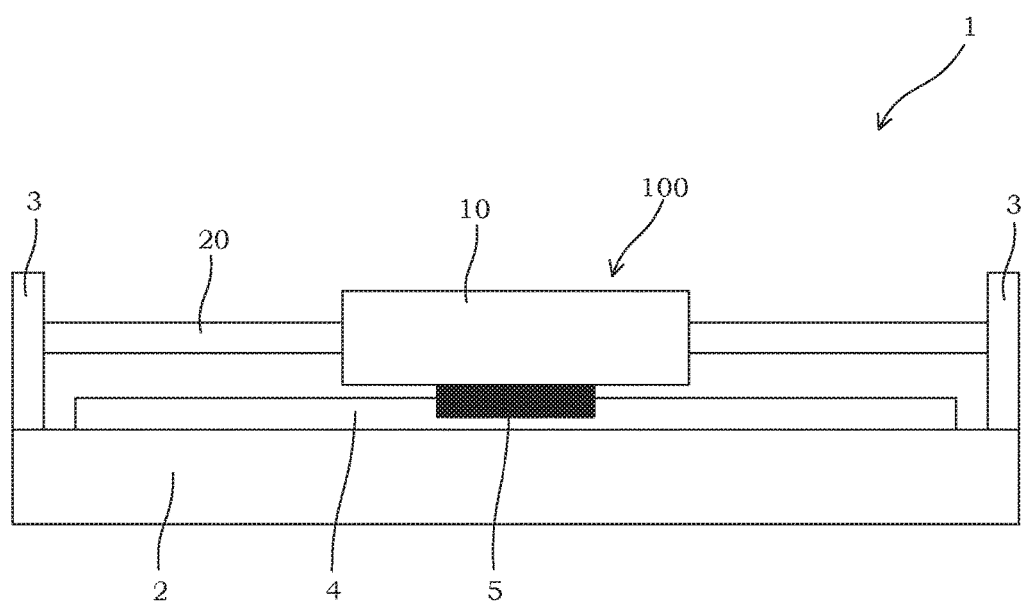
FIG. 1 is a schematic view showing a configuration of an actuation system including a linear motor according to an embodiment of the present invention.

Referring to FIG. 1, an actuation system 1 including a linear motor 100 according to the present embodiment will be described.

The actuation system 1 includes: the linear motor 100 including a tubular yoke 10 and a rod 20; a mounting portion 2 on which the linear motor 100 is mounted; support portions 3 each standing on the mounting portion 2 to support both ends of the rod 20; a rail 4 disposed on the mounting portion 2; and a carrier 5 that moves along the rail 4 while the yoke 10 is fixed thereto. When the linear motor 100 is driven, the yoke 10 moves along the rail 4 together with the carrier 5. In the actuation system 1, a driving subject such as a component is mounted on the yoke 10 so that the driving subject can be moved in a straight line.

It should be noted that although the actuation system 1 is configured as a driving actuation system for driving a driving subject, the actuation system 1 is not limited to this configuration. By attaching the yoke 10 of the linear motor 100 to one of two members that are displaced relative to each other and attaching the rod 20 of the linear motor 100 to the other member, the actuation system 1 may be configured as a damping actuation system that suppresses relative displacement between the two members.

Figure 2:
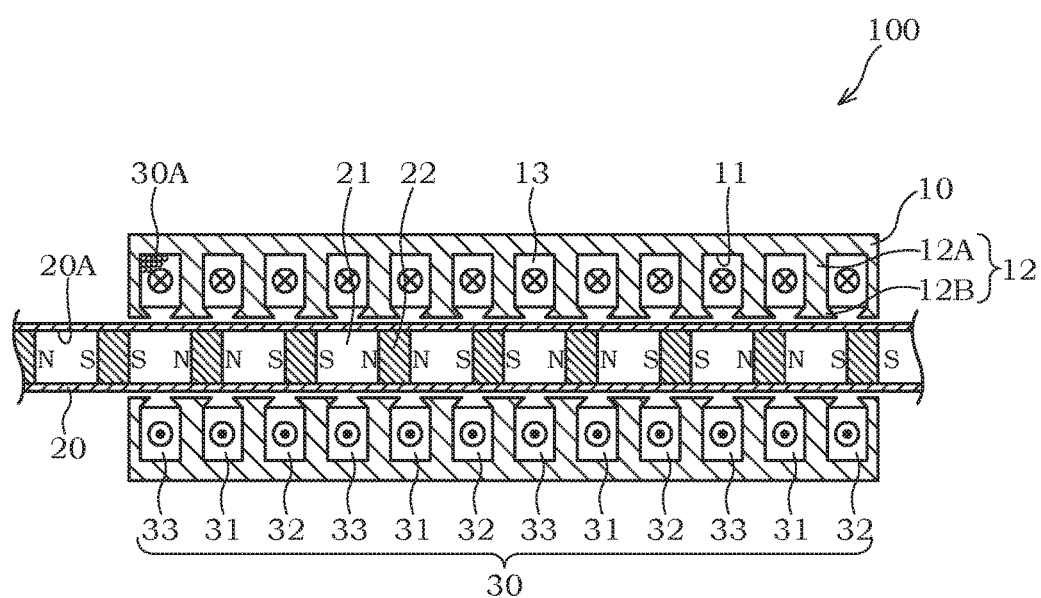
FIG. 2 is a sectional view showing a part of the linear motor.

Next, a configuration of the linear motor 100 that serves as a drive source of the actuation system 1 will be described with reference to FIG. 2.

The linear motor 100 includes the yoke 10 that is formed as a tubular body, the rod 20 that penetrates an interior of the yoke 10 in a yoke axis direction, a plurality of coils 30 provided in the yoke 10, and a plurality of permanent magnets 21 held in the rod 20. In the linear motor 100, thrust for displacing the yoke 10 and the rod 20 relative to each other in an axial direction is generated by attracting the permanent magnets 21 held in the rod 20 using a moving magnetic field that is generated around the coils 30 when an alternating current is passed through the coils 30.

The yoke 10 is a cylindrical member formed from a magnetic material (soft iron, for example). Teeth 12 are formed in the yoke 10 so as to project toward a yoke center from an inner peripheral surface 11.

Each of the teeth 12 includes an upright portion 12A that stands upright from the inner peripheral surface 11 and extends in an inner peripheral direction of the yoke 10, and a tip end portion 12B provided on a tip end of the upright portion 12A. An end surface of the tip end portion 12B of the tooth 12 is configured to oppose an outer peripheral surface of the rod 20. A width (a thickness in the yoke axis direction) of the tip end portion 12B is set to be larger than a width (a thickness in the yoke axis direction) of the upright portion 12A. Further, the width of the tip end portion 12B is formed so as to increase gradually toward the yoke center.

Thirteen teeth 12 configured as described above are arranged in the yoke 10 along the axial direction. These teeth 12 are disposed at equal intervals between both ends of the yoke 10. The widths of the upright portions 12A and tip end portions 12B of the teeth 12 positioned at the both ends of the yoke 10 are respectively set to half of the widths of the upright portion 12A and tip end portion 12B of each of the other teeth 12.

Slots 13 are respectively formed between adjacent teeth 12, 12 in the axial direction. The slots 13 are annular grooves in which the coils 30 are respectively disposed. In the present embodiment, thirteen teeth 12 are formed, and the number of the slots 13 is thus twelve. One coil 30 is disposed in an interior of each of the slots 13.

The number of coils 30 corresponds to the number of slots, and twelve coils 30 are provided. The twelve coils 30 are constituted by four U-phase coils 31, four V-phase coils 32, and four W-phase coils 33.

The coils 31 to 33 of the respective phases are formed in a ring shape by winding insulation-coated metal wires 30A around an axis of the rod 20 in an identical direction. In other words, the metal wires 30A of the coils 30 are wound from a paper surface front side to a paper surface rear side in an upper side position of the slot 13, and wound from the paper surface rear side to the paper surface front side in a lower side position of the same slot 13. It should be noted that FIG. 2 shows only a part of the metal wire 30A of one coil 30, but the other parts are omitted.

Further, the coils 31 to 33 of the respective phases are disposed alternately, one phase by one phase, in order of the W-phase coil 33, the U-phase coil 31, and the V-phase coil 32 from the slot 13 at a left end side toward the slot 13 at a right end side.

The rod 20 disposed coaxially with the yoke 10 is a cylindrical member formed from a non-magnetic material (stainless steel, for example). The rod 20 has a through hole 20A that penetrates the rod 20 in the axial direction. Both ends of the rod 20 are respectively fixed to the support portions 3 (see FIG. 1) provided on the mounting portion 2 (see FIG. 1).

The plurality of permanent magnets 21 is held in the through hole 20A of the rod 20 so as to be arranged in the axial direction. Each of the permanent magnets 21 is formed in a columnar shape and magnetized so that an N pole and an S pole occur in the axial direction. These permanent magnets 21 are provided at equal intervals, and two adjacent permanent magnets 21 are disposed so that identical poles face to each other. Further, columnar yokes 22 formed from a magnetic material are provided between adjacent permanent magnets 21.

In the linear motor 100, the number of the permanent magnets 21 and the number of the columnar yokes 22, which are positioned in the yoke 10, are respectively set to eight in a condition where the rod 20 is inserted into the yoke 10. In other words, a sum of an axial direction length of the eight permanent magnets 21 and eight columnar yokes 22 arranged in the rod 20 is set to be equal to an axial direction length of the yoke 10, or in other words a distance between outside ends of the teeth 12 positioned at the both ends of the yoke 10. Hence, the linear motor 100 is configured as an eight-pole, twelve-slot linear motor in which the number of permanent magnets 21 positioned in the yoke 10 is eight and the number of slots 13 formed in the yoke 10 is twelve.

It should be noted that the columnar yokes 22 do not necessarily have to be provided, and instead the permanent magnets 21 may be provided directly adjacent to each other. In this case, the axial direction length of the eight permanent magnets 21 positioned in the yoke 10 is set to be equal to the axial direction length of the yoke 10.

Figure 3:
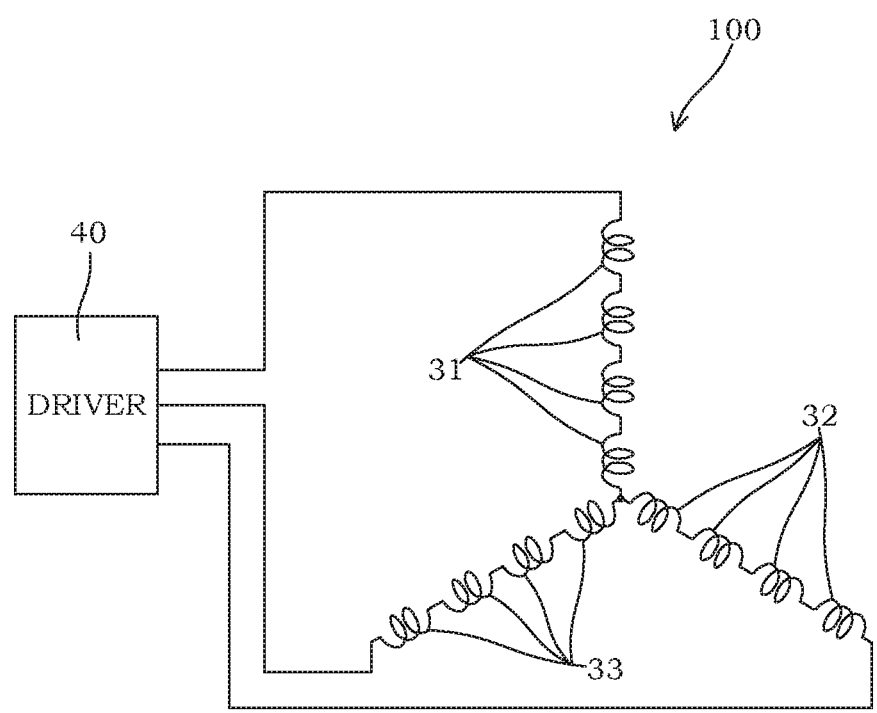
FIG. 3 is a view showing an equivalent electric circuit of the linear motor.

As shown in FIG. 3, in the linear motor 100, the four U-phase coils 31 are connected in series. Similarly, the four V-phase coils 32 and the four W-phase coils 33 are respectively connected in series. Respective end portions of the U-phase coil 31, the V-phase coil 32, and the W-phase coil 33 disposed in a first position are Y-connected, while respective end portions of the U-phase coil 31, the V-phase coil 32, and the W-phase coil 33 disposed in a fourth position are connected to a driver 40.

The driver 40 is a control device that controls supply of an alternating current to the coils 31 to 33 of the respective phases. The driver 40 controls a frequency, an application timing, and so on of the alternating current on the basis of information indicating relative positions of the yoke 10 and the rod 20. The relative positions are detected by a position sensor (not shown in the drawings). As a result, a thrust generated by the linear motor 100 and a thrust generation direction are adjusted, and the yoke 10 is moved along the rail 4 together with the carrier 5 by means of the adjusted thrust (see FIG. 1).

In the linear motor, various combinations of the number of poles (the number of permanent magnets) and the number of slots may be employed, but winding directions of the coils of the respective phases provided in the slots must be determined in accordance with the combination. In the linear motor 100 according to the present embodiment, however, an eight-pole, twelve-slot configuration is employed, and therefore all of the coils 30 provided in the slots 13 of the yoke 10 can be wound in the same direction. Hence, the configuration of the linear motor 100 can be simplified, and as a result, the linear motor 100 can be manufactured easily.

Further, the inventors of the present application tested thrusts generated by various linear motors, including the eight-pole, twelve-slot linear motor 100, in a simulation.

Figure 4:
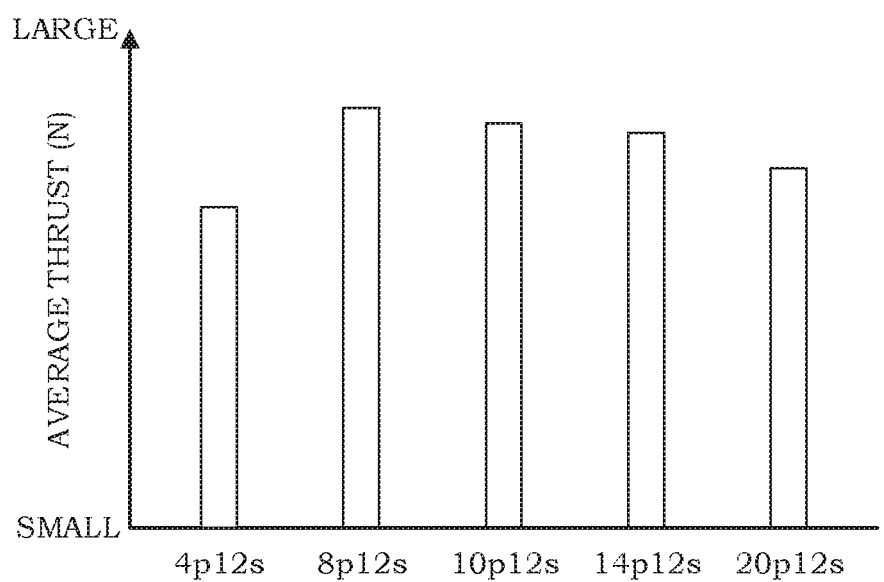
FIG. 4 is a thrust characteristic diagram showing respective average thrusts of the linear motor according to the present embodiment and other linear motors according to reference examples.

FIG. 4 is a view comparing average thrusts respectively generated by five linear motors, that is, a four-pole, twelve-slot (4p12s) linear motor, an eight-pole, twelve-slot (8p12s) linear motor, a ten-pole, twelve-slot (10p12s) linear motor, a fourteen-pole, twelve-slot (14p12s) linear motor, and a twenty-pole, twelve-slot (20p12s) linear motor, when an alternating current of an identical frequency and an identical amplitude was passed through the respective linear motors. The four linear motors other than the eight-pole, twelve-slot linear motor 100 are also single phase coil type linear motors in which one of a V-phase coil, a U-phase coil, and a W-phase coil is disposed in each slot. As shown in FIG. 4, according to the thrust simulation carried out by the inventors of the present application, the most superior thrust characteristic was obtained with the eight-pole, twelve-slot linear motor 100.

According to the linear motor 100 of the present embodiment described above, following effects can be obtained.

The linear motor 100 is configured as an eight-pole, twelve-slot linear motor in which all of the coils 30 disposed in the twelve slots 13 are formed by being wound around the axis of the rod 20 in the identical direction. In the eight-pole, twelve-slot linear motor 100, all of the coils 30 can be wound in the same winding direction, and therefore the motor configuration can be simplified in comparison with a conventional linear motor. Further, according to the eight-pole, twelve-slot linear motor 100, as shown in FIG. 4, a large thrust in an axial direction can be generated.

In the linear motor 100 according to the present embodiment, the U-phase coils 31, V-phase coils 32, and W-phase coils 33 can simply be disposed alternately, one phase by one phase, in the axial direction. Hence, arrangement of the coils 31 to 33 of the respective phases is easy to understand, and therefore the linear motor 100 can be manufactured easily.

Figure 5:
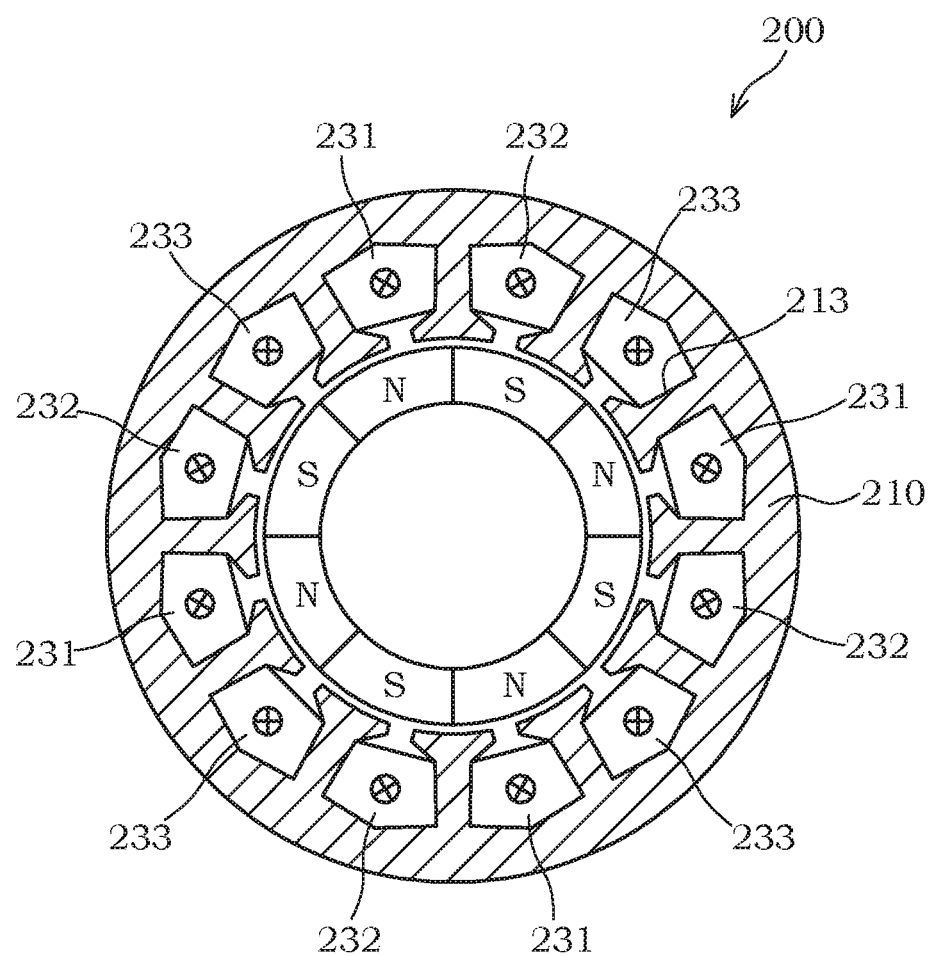
FIG. 5 is a schematic view showing a configuration of an eight-pole, twelve-slot rotary motor according to a reference example.

It should be noted that the predetermined number of poles and the predetermined number of slots forming a linear motor may also be used to form a rotary motor. However, in a single phase coil type eight-pole, twelve-slot rotary motor 200, as shown in FIG. 5, V-phase coils 231, U-phase coils 232, and W-phase coils 233 must be wound through slots 213 toward one axial direction side of a yoke 210, and it is extremely difficult to wind the coils 231 to 233 of the respective phases in this manner. The single phase coil type eight-pole, twelve-slot rotary motor 200 shown in FIG. 5 is therefore not a realistic motor, and a single phase coil type eight-pole, twelve-slot motor is believed to be realizable only as the linear motor 100 according to the present embodiment.

As described above, although the embodiment of the present invention have been explained, the above embodiment merely illustrates a part of examples of application of the present invention, and it does not mean that a technical scope of the present invention is limited to a specific configuration of the embodiment described above.

The linear motor 100 according to the present embodiment is an eight-pole, twelve-slot linear motor, but is not limited thereto. The linear motor 100 may be any 8n-pole, 12n-slot (where n is a positive integer) linear motor. Such an 8n-pole, 12n-slot linear motor 100 includes 12n+1 teeth 12 on an inner peripheral surface of a yoke 10, 12n slots 13 formed between adjacent teeth 12, and 12n coils respectively provided in the slots 13. The 8n-pole, 12n-slot linear motor 100 is configured so that the number of permanent magnets 21 positioned in the yoke is 8n. Likewise in this case, the respective coils 30 are formed by being wound in an identical direction around an axis of a rod 20 in which the permanent magnets 21 are held.

It should be noted that the 12n coils 30 are constituted by 4n U-phase coils 31, 4n V-phase coils 32, and 4n W-phase coils 33. Likewise in the 8n-pole, 12n-slot linear motor 100, the U-phase coils 31, V-phase coils 32, and W-phase coils 33 are disposed alternately, one phase by one phase, in an axial direction.

Further, in the linear motor 100 according to the present embodiment, the plurality of permanent magnets 21 is fixed in the through hole 20A of the rod 20 so as to be arranged in the axial direction. However, arrangement of the permanent magnets 21 is not limited to this arrangement. For example, the permanent magnets 21 may be formed in a ring shape and fitted externally to an outer periphery of the rod 20, and the plurality of permanent magnets 21 may be disposed so as to be arranged in the axial direction.

The present application claims priority based on Japanese Patent Application No. 2014-49288, filed with the Japan Patent Office on Mar. 12, 2014, the entire content of which is incorporated into the present specification by reference.

The invention claimed is:

1. A linear motor, comprising:
   a tubular body having an inner peripheral surface;
   a rod that penetrates the tubular body in an axial direction, the linear motor being configured to displace the tubular body and the rod relative to each other in the axial direction, the linear motor further comprising:
   a plurality of teeth including 12n+1 teeth, where n is a positive integer, arranged in the axial direction so as to project from the inner peripheral surface of the tubular body;
   12n slots respectively formed between adjacent teeth of the plurality of teeth;
   12n coils respectively disposed in the slots; and
   a plurality of permanent magnets held in the rod so as to be arranged in the axial direction,
   wherein the respective coils are formed by being wound around an axis of the rod in an identical direction, and
   wherein the number of permanent magnets positioned in the tubular body is set to 8n.

2. The linear motor according to claim 1,
   wherein the 12n coils are constituted by coils of three phases including 4n U-phase coils, 4n V-phase coils, and 4n W-phase coils, and
   wherein the coils of the three phases are arranged in sequence, one phase by one phase, in the axial direction.

3. A linear motor configured to be supplied by a three-phase alternating current, the linear motor comprising:
   a tubular body having an inner peripheral surface;
   a rod that penetrates the tubular body in an axial direction, the linear motor being configured to displace the tubular body and the rod relative to each other in the axial direction;
   a plurality of teeth including 12n+1 teeth, where n is a positive integer, arranged in the axial direction so as to project from the inner peripheral surface of the tubular body;
   12n slots respectively formed between adjacent teeth of the plurality of teeth;
   12n coils respectively disposed in the slots; and
   a plurality of permanent magnets held in the rod so as to be arranged in the axial direction,
   wherein the respective coils are formed by being wound around an axis of the rod in an identical direction which is made operational by said three-phase alternating current, and
   wherein the number of permanent magnets positioned in the tubular body is set to 8n.

4. The linear motor according to claim 3,
   wherein the 12n coils are constituted by coils of three phases including 4n U-phase coils, 4n V-phase coils, and 4n W-phase coils, and
   wherein the coils of the three phases are arranged in sequence, one phase by one phase, in the axial direction.

* * * * *